United States Patent
Wei (10) Patent No.: US 10,448,229 B2
(45) Date of Patent: Oct. 15, 2019

(54) DEVICE-TO-DEVICE COMMUNICATION METHOD, METHOD FOR ASSIGNING DEVICE-TO-DEVICE COMMUNICATION RESOURCE, AND APPARATUSES THEREOF

(71) Applicant: Beijing Zhigu Rui Tuo Tech Co., Ltd., Beijing (CN)

(72) Inventor: Na Wei, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 112 days.

(21) Appl. No.: 15/284,614

(22) Filed: Oct. 4, 2016

(65) Prior Publication Data

US 2017/0150538 A1    May 25, 2017

(30) Foreign Application Priority Data

Nov. 24, 2015   (CN) .......................... 2015 1 0824398

(51) Int. Cl.
*H04W 4/70* (2018.01)
*H04W 72/02* (2009.01)
(Continued)

(52) U.S. Cl.
CPC ............. *H04W 4/70* (2018.02); *H04W 72/02* (2013.01); *H04W 76/14* (2018.02); *H04W 72/1278* (2013.01)

(58) Field of Classification Search
CPC combination set(s) only.
See application file for complete search history.

(56) References Cited

U.S. PATENT DOCUMENTS

2012/0243431 A1    9/2012   Chen et al.
2014/0044024 A1    2/2014   Zou et al.
(Continued)

FOREIGN PATENT DOCUMENTS

CN          102792745 A     11/2012
CN          104469961 A     3/2015
(Continued)

*Primary Examiner* — Junpeng Chen
(74) *Attorney, Agent, or Firm* — Sheppard Mullin Richter & Hampton LLP (57) ABSTRACT

Embodiments of the present application disclose a device-to-device (D2D) communication method, a method for assigning a D2D communication resource, and apparatuses thereof. The D2D communication method comprises: determining a usable resource in a D2D communication resource; and sending scheduling assignment (SA) information correlated to at least one D2D device by using a first control channel resource in a D2D control channel resource, wherein the first control channel resource is only used to transmit control information correlated to first-type D2D communication, and a first physical parameter configuration of the first control channel resource is different from a physical parameter configuration of another control channel resource in the D2D control channel resource. For the methods and apparatuses in the embodiments of the present application, a control channel resource independent of other D2D communication is used, so that at the same time when transmission quality of specific-type D2D communication is improved, use efficiency as the specific-type D2D communication and other D2D communication coexist on a spectrum resource is improved.

15 Claims, 4 Drawing Sheets

(51) Int. Cl.
*H04W 76/14* (2018.01)
*H04W 72/12* (2009.01)

(56) References Cited

U.S. PATENT DOCUMENTS

| | | | |
|---|---|---|---|
| 2014/0254567 | A1 | 9/2014 | Han et al. |
| 2015/0327180 | A1* | 11/2015 | Ryu .................. H04L 1/00 370/329 |
| 2016/0066337 | A1* | 3/2016 | Sartori ............. H04W 76/023 370/329 |
| 2016/0249355 | A1* | 8/2016 | Chae ............... H04W 72/1263 |
| 2016/0295624 | A1* | 10/2016 | Novlan ............. H04W 76/14 |
| 2016/0360524 | A1* | 12/2016 | Blasco Serrano .... H04W 76/14 |
| 2017/0006580 | A1* | 1/2017 | Patil .................. H04L 5/0007 |
| 2017/0079026 | A1* | 3/2017 | Li .................... H04W 72/04 |
| 2017/0079085 | A1* | 3/2017 | Yang ................. H04W 72/02 |
| 2017/0187503 | A1* | 6/2017 | Seo .................. H04L 5/0048 |
| 2017/0374539 | A1* | 12/2017 | Chae .................. H04W 8/005 |

FOREIGN PATENT DOCUMENTS

| | | |
|---|---|---|
| CN | 104521314 A | 4/2015 |
| CN | 104770048 A | 7/2015 |
| CN | 104869526 A | 8/2015 |

\* cited by examiner

DEVICE-TO-DEVICE COMMUNICATION METHOD, METHOD FOR ASSIGNING DEVICE-TO-DEVICE COMMUNICATION RESOURCE, AND APPARATUSES THEREOF

TECHNICAL FIELD

The present application relates to the field of communications technologies, and more particularly to a device-to-device (D2D) communication method, a method for assigning D2D communication resource, and apparatuses thereof.

BACKGROUND

As a critical candidate technology for the fifth generation mobile communication technology (5G), D2D communication has potential prospects of improving system performance, improving user experience, and extending cellular communications applications and has received wide attention. D2D communication based on a cellular network (or referred to as proximity service (ProSe)) means that user data can be directly transmitted between terminal devices without being relayed by a network.

One of the development targets of mobile communication is to establish an extensive interconnected network that comprises various types of terminals, which is also one of the purposes of developing the Internet of Things inside the framework of a cellular communication currently. According to the prediction of the industry, by the year 2020, globally there will be about 50 billion cellular access terminals, most of which will be machine communication terminals that have Internet of Things features. By means of the combination of a D2D technology and the Internet of Things, an interconnected wireless communication network of real significance may appear.

SUMMARY

In view of this, an objective of embodiments of the present application is to provide a D2D communication solution to which the Internet of Things is introduced.

To implement the foregoing objective, according to a first aspect of an embodiment of the present application, a D2D communication method is provided, wherein the method comprises:

determining a usable resource in a D2D communication resource, where the usable resource comprises a D2D control channel resource and a D2D data channel resource; and sending scheduling assignment (SA) information correlated to at least one D2D device by using a first control channel resource in the D2D control channel resource, wherein the first control channel resource is only used to transmit control information correlated to first-type D2D communication, and a first physical parameter configuration of the first control channel resource is different from a physical parameter configuration of another control channel resource in the D2D control channel resource; and the SA information is used to instruct the at least one D2D device to perform data transmission of the first-type D2D communication by using the D2D data channel resource.

According to a second aspect of an embodiment of the present application, a method for assigning a D2D communication resource is provided, wherein the method comprises:

acquiring a scheduling instruction, where the scheduling instruction is used to instruct a user device to perform transmission preparation;

acquiring a resource assignment message, where the resource assignment message is used to indicate a usable carrier that is assigned for the transmission of the user device; and in response to the resource assignment message, performing transmission on the usable carrier at least according to the scheduling instruction.

According to a third aspect of the present application, a D2D communication apparatus is provided, wherein the apparatus comprises:

a first determining module, configured to determine a usable resource in a D2D communication resource, where the usable resource comprises a D2D control channel resource and a D2D data channel resource; and a first sending module, configured to send SA information correlated to at least one D2D device by using a first control channel resource in the D2D control channel resource, wherein the first control channel resource is only used to transmit control information correlated to first-type D2D communication, and a first physical parameter configuration of the first control channel resource is different from a physical parameter configuration of another control channel resource in the D2D control channel resource; and the SA information is used to instruct the at least one D2D device to perform data transmission of the first-type D2D communication by using the D2D data channel resource.

According to a fourth aspect of the present application, an apparatus for assigning a D2D communication resource is provided, wherein the apparatus comprises:

a resource assignment module, configured to assign a resource correlated to D2D communication; and a second sending module, configured to send resource assignment information correlated to the assignment, wherein the resource correlated to D2D communication comprises a D2D control channel resource and a D2D data channel resource, wherein the D2D control channel resource comprises a first control channel resource, the first control channel resource is only used to transmit control information correlated to first-type D2D communication, and a first physical parameter configuration of the first control channel resource is different from a physical parameter configuration of another control channel resource in the D2D control channel resource.

According to a fifth aspect of the present application, a D2D communication apparatus is provided, wherein the apparatus comprises:

a transceiver;

a memory, configured to store an instruction; and a processor, configured to execute the instruction stored in the memory, where the instruction causes the processor to execute the following steps:

determining a usable resource in a D2D communication resource, where the usable resource comprises a D2D control channel resource and a D2D data channel resource; and sending, by using the transceiver, SA information correlated to at least one D2D device by using a first control channel resource in the D2D control channel resource, wherein the first control channel resource is only used to transmit control information correlated to first-type D2D communication, and a first physical parameter configuration of the first control channel resource is different from a physical parameter configuration of another control channel resource in the D2D control channel resource; and the SA information is used to instruct the at least one D2D device to perform data transmission of the first-type D2D communication by using the D2D data channel resource.

According to a sixth aspect of the present application, an apparatus for assigning a D2D communication resource is provided, wherein the apparatus comprises:

a transceiver;

a memory, configured to store an instruction; and a processor, configured to execute the instruction stored in the memory, where the instruction causes the processor to execute the following steps:

assigning a resource correlated to D2D communication; and sending resource assignment information correlated to the assignment by using the transceiver, wherein the resource correlated to D2D communication comprises a D2D control channel resource and a D2D data channel resource, wherein the D2D control channel resource comprises a first control channel resource, the first control channel resource is only used to transmit control information correlated to first-type D2D communication, and a first physical parameter configuration of the first control channel resource is different from a physical parameter configuration of another control channel resource in the D2D control channel resource.

For the methods and apparatuses in the embodiments of the present application, a control channel resource independent of other D2D communication is used, so that at the same time when transmission quality of specific-type D2D communication is improved, use efficiency as the specific-type D2D communication and other D2D communication coexist on a spectrum resource is improved.

DETAILED DESCRIPTION

The specific implementing manners of the present invention are further described below in detail with reference to the accompanying drawings and embodiments. The embodiments below are used for describing the present invention rather than to limit the scope of the present invention.

Persons skilled in the art may understand that the terms such as "first" and "second" in the present application are merely used to distinguish different devices, modules or parameters, and neither represent any specific technical meanings, nor represent a necessary logical order among the different devices, modules or parameters.

In the embodiments of the present application, the term "D2D device" is any device having a D2D communication capability, and comprises but not limited to: a telephone (for example, a cellphone or a smartphone), a computer (for example, a notebook computer), a portable communications device, a portable computing device (for example, a personal digital assistant), an entertainment device (for example, a music or video device, or a satellite radio device), a vehicle-mounted smart device, a wearable device or any another suitable device configured with a D2D communication capability. The term "base station" may comprise, be implemented as, or be referred to as a node B, an evolved node B (eNode B), a radio network controller (RNC), a base station controller (BSC), a base transceiver station (BTS), a base station (BS), a transceiver function (TF), a wireless router, a radio transceiver, a basic service set (BSS), an extended service set (ESS), a radio base station (RBS), or another term.

Figure 1A:
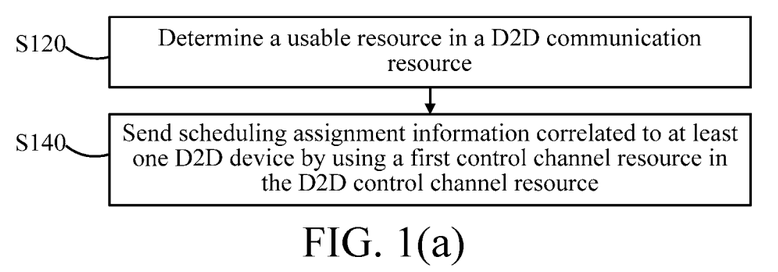
FIG. 1(a) is a flowchart of an example of a D2D communication method according to an embodiment of the present application.

FIG. 1(a) is a flowchart of an example of a D2D communication method according to an embodiment of the present application. The method may be implemented by any D2D device. As shown in FIG. 1(a), the method comprises:

S120: Determine a usable resource in a D2D communication resource, where the usable resource comprises a D2D control channel resource and a D2D data channel resource.

S140: Send SA information correlated to at least one D2D device by using a first control channel resource in the D2D control channel resource.

The D2D control channel resource is, for example, a PSCCH, and is used to transmit control information correlated to D2D communication. The D2D data channel resource is, for example, a physical sidelink shared channel (PSCCH), and is used to transmit D2D data. In the method in this embodiment, the first control channel resource is only used to transmit control information correlated to first-type D2D communication. To meet a communication requirement (for example, a delay requirement) of the first-type D2D communication, a first physical parameter configuration of the first control channel resource is different from a physical parameter configuration of another control channel resource in the D2D control channel resource, and the first physical parameter configuration of the first control channel resource may also be predefined, for example, is specified by a base station. Therefore, the at least one D2D device demodulates control information received on the first control channel resource according to a known first physical parameter configuration matching the first control channel resource.

Figure 1B:
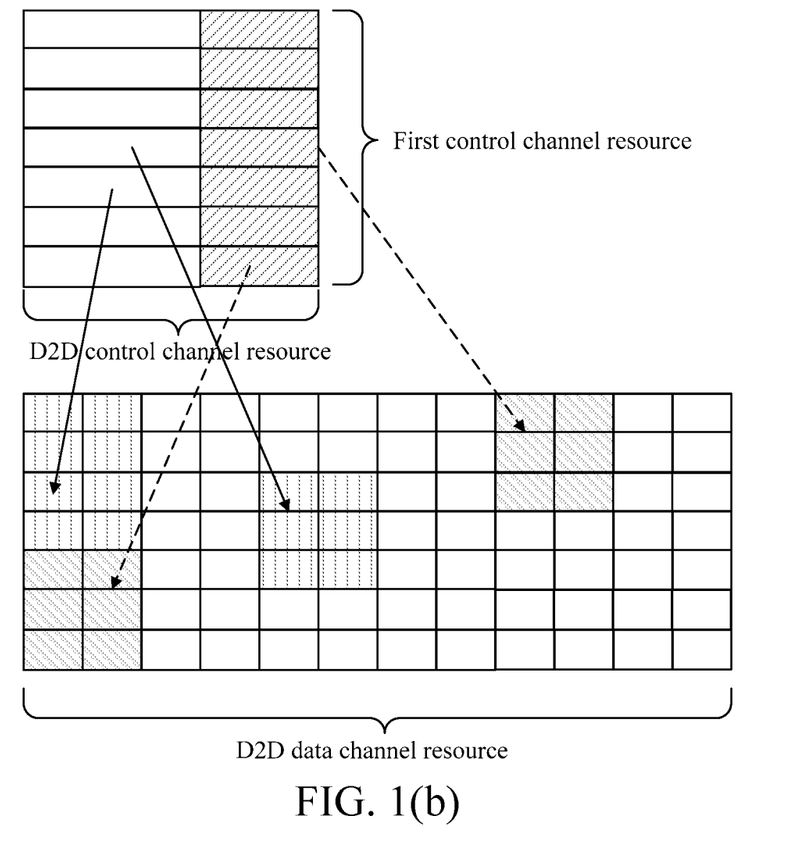
FIG. 1(b) is a schematic diagram of a configuration of D2D communication resources in an example.

In the method in this embodiment, the first-type D2D communication may be any communication manner combined with a D2D communication technology. The combination comprises resource sharing. Such first-type D2D communication may be, for example, Internet of Things communication. Because a spectrum resource assigned by a base station to a D2D device is used, the first-type D2D communication is also referred to as specific type (first type) D2D communication herein. In the resource that is assigned by the base station and is used to perform D2D communication, the base station may specify that a part of the resource is dedicated to specific-type D2D communication, that is, the first-type D2D communication. The first control channel resource that is dedicated to the first-type D2D communication may have, according to a requirement of the first-type D2D communication, a physical parameter configuration (referred to as a first physical parameter configuration) different from that of another D2D control channel resource. The first physical parameter configuration comprises but not limited to at least one of the following: a reference signal density, a cyclic prefix CP length, a carrier interval, and the like. The SA information is used to instruct the at least one D2D device to perform data transmission of the first-type D2D communication by at least partially using the D2D data channel resource. In other words, in the method in this embodiment, the first-type D2D communication uses a D2D control channel resource different from that of other D2D communication, but a same D2D data channel resource may be shared. As shown in FIG. 1(b), a part of the D2D control channel resource is a first control channel resource dedicated to first-type D2D. As shown by a backslash fill in FIG. 1(b), the control information transmitted on the D2D control channel resource indicates (as shown by a solid-line arrow) that the D2D data channel resource can be used in all D2D communication, which comprises the first-type D2D communication. SA transmitted on the first control channel resource indicates that D2D devices that perform the first-type D2D communication at least partially share the D2D data channel resource, and indicates (as shown by a dotted-line arrow) positions of data channel resources corresponding to the D2D devices, and the positions are shown by a slash fill in FIG. 1(b).

In conclusion, in the method in this embodiment, a control channel resource independent of other D2D communication is used, so that at the same time when transmission quality of specific-type D2D communication is improved, use efficiency as the specific-type D2D communication and other D2D communication coexist on a spectrum resource is improved.

As discussed above, the first-type D2D communication is a communication type that has a specific transmission requirement. In the method in this embodiment, the D2D device may determine, based on a specific property of such first-type D2D communication, to use the first control channel resource to transmit control information related to that a target D2D device performs the first-type D2D communication. Specifically:

In a possible implementing manner, the first-type D2D communication may be a communication type related to a D2D device that moves at a high speed. D2D communication in high-speed movement requires, for example, denser reference signals, and longer cyclic prefixes, to adapt to rapid changes in channel conditions. In such an implementing manner, the first control channel resource may be used according to a speed of a communication object to send SA. In such a case, Step S120 may further comprise:

S122: In response to that a speed of the at least one D2D device meets a first preset condition, send the SA information by using the first control channel resource. The first preset condition may be a predefined speed threshold or range matching the first-type D2D communication. For example, the speed of a D2D device stays above the speed threshold within a particular time period, and the first preset condition and a physical configuration parameter of the first control channel resource may be set according to a transmission requirement of the first-type D2D communication.

Such a communication type related to a D2D device that moves at a high speed may be, for example, Vehicle-to-Vehicle (V2V) communication in the Internet of Vehicles. That is, the first communication type may be V2V communication. The V2V communication is one of the typical scenarios of D2D communication that are enhanced for the Internet of Things. For example, for an operation or action such as high-speed driving, lane changing, and speed reduction of a vehicle, a warning may be sent by using a manner of D2D communication, and another vehicle around the vehicle gives an alarm to a driver based on the received warning, or even automatic manipulation of the vehicle is performed in an emergency, so as to shorten a reaction time of the driver in an emergent situation during driving, and reduce the rate of occurrence of traffic accidents. In addition, by using D2D discovery, a vehicle may discover and recognize a specific vehicle near the vehicle more reliably, where the specific vehicle is, for example, a vehicle that is passing by a crossing and faces a potential danger, or a vehicle that has a specific property and requires special attention (for example, a vehicle carrying hazardous materials, and a school bus). The V2V communication usually relates to high-speed movement of a D2D device, and requires a relatively high transmission quality in the high-speed movement.

In another possible implementing manner, the first-type D2D communication may be recognized by using a device type of a D2D communications device. In such an implementing manner, a D2D device may use the first control channel resource according to a device type of a communication object. Specifically, Step S120 may further comprise:

S124: In response to that a device type of the at least one D2D device meets a second preset condition, send the SA information by using the first control channel resource. The second preset condition may be one or more predefined device types matching the first-type D2D communication, and the second preset condition and the physical configuration parameter of the first control channel resource may be set according to a transmission requirement of the first-type D2D communication.

The first control channel resource may be used in response to that the device type of the D2D device is a vehicle or an on-board device (V2V communication). Alternatively, the first control channel resource may be used in response to that the device type of the D2D device relates to a specific-type application scenario, for example, public safety, and medical care.

In still another possible implementing manner, the first-type D2D communication may be recognized by using content of data to be transmitted. In such an implementing manner, the D2D device may use the first control channel resource according to content of data to be transmitted to the at least one D2D device. Specifically, Step S120 may further comprise:

S126: In response to that content of data to be transmitted to the at least one D2D device meets a third preset condition, send the SA information by using the first control channel resource. The third preset condition may be a predefined condition that matches the first-type D2D communication and is related to the content of the data. The condition is, for example, an importance level of the content of the data to be transmitted (for example, in scenarios such as public safety and medical care, content of data to be transmitted has a relatively high importance level). When the content of the data to be transmitted has a high importance level, the first control channel resource is used to send the SA information, or otherwise, a conventional D2D control channel resource is used. The third preset condition and the physical configuration parameter of the first control channel resource may be set according to a transmission requirement of the first-type D2D communication.

It should be noted that, according to a specific type and/or application scenario of the first-type D2D communication, a different physical configuration parameter of a first control channel resource may be designed.

In addition, in the method in this embodiment, a D2D device that receives SA transmitted on a first control channel resource may transmit, in response to that the SA is received on the first control channel resource, a data packet having a second physical parameter configuration matching first D2D communication, so as to better meet a transmission quality requirement of the first-type D2D communication. For example, for V2V communication, denser reference signals, longer cyclic prefixes, larger symbol lengths, and the like may be used. Alternatively, the data packet may be encapsulated and transmitted by using a physical parameter configuration of a conventional D2D data packet. In a possible implementing manner, the SA is used to indicate a specific position of a D2D data channel resource that can be used by the D2D device, and in addition, may be further used to indicate the second physical parameter configuration, of the data packet, matching the first-type D2D communication. That is, according to a transmission requirement of the first-type D2D communication, in addition to the physical parameter of the first control channel resource, in the method in this embodiment, a corresponding physical parameter configuration may be further indicated for data correlated to first type D2D, where the physical parameter configuration comprises a reference signal density, a cyclic prefix length, and the like. In such a case, when the SA transmitted on the first control channel resource is received, the data packet having the second physical parameter configuration is encapsulated and transmitted according to the indication of the SA.

It should be further noted that, the method in this embodiment may further comprise the steps:

S112: Receive resource assignment information correlated to the D2D communication resource.

S114: Determine the D2D communication resource based on the resource assignment information.

For example, resource assignment information sent by a base station is received, where the resource assignment information indicates a D2D control channel resource and a D2D data channel resource that are assigned by the base station and may be used for D2D communication, and the resource assignment information further indicates a first control channel resource. In Step S120, an actual usable resource in the D2D communication resource assigned by the base station may be determined by using a manner of, for example, contention.

In conclusion, the method in this embodiment, D2D communication is enhanced for the Internet of Things, an independent D2D control channel resource more suitable for a specific communication type such as the Internet of Things is provided, and data communication parts share a D2D data channel resource, so as to share the D2D data channel resource to the greatest extent, configure a large quantity of data channel resources more flexibly, and especially adapt to a requirement of a user that first-type D2D communication and other D2D communication need to be used at a same moment.

Figure 2:
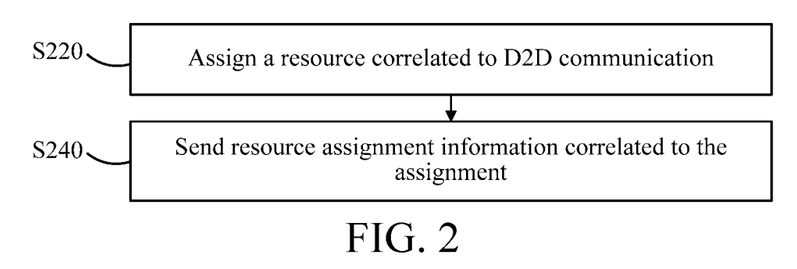
FIG. 2 is a flowchart of an example of a method for assigning a D2D communication resource according to an embodiment of the present application.

FIG. 2 is a flowchart of an example of a method for assigning a D2D communication resource according to an embodiment of the present application. The method may be implemented by a base station. As shown in FIG. 2, the method comprises:

S220: Assign a resource correlated to D2D communication.

S240: Send resource assignment information correlated to the assignment.

The resource correlated to D2D communication comprises a D2D control channel resource and a D2D data channel resource, wherein the D2D control channel resource comprises a first control channel resource, the first control channel resource is only used to transmit control information correlated to first-type D2D communication, a first physical parameter configuration of the first control channel resource is different from a physical parameter configuration of another control channel resource in the D2D control channel resource, and the D2D data channel resource is used to transmit all D2D data.

As described with reference to FIG. 1(a), the D2D control channel resource is used to transmit control information correlated to D2D communication. The D2D data channel resource is used to transmit D2D data. In the method in this embodiment, in the D2D control channel resource, a base station assigns a dedicated first control channel resource for the first-type D2D communication, where the first control channel resource is only used to transmit control information correlated to the first-type D2D communication. To meet a communication requirement (for example, a delay requirement) of the first-type D2D communication, the first physical parameter configuration of the first control channel resource is different from a physical parameter configuration of another control channel resource in the D2D control channel resource, and the first physical parameter configuration of the first control channel resource may also be predefined, for example, is specified by a base station. Therefore, the at least one D2D device demodulates control information received on the first control channel resource according to a known first physical parameter configuration matching the first control channel resource.

In the method in this embodiment, the first-type D2D communication may be any communication manner combined with a D2D communication technology. The combination comprises resource sharing. Such first-type D2D communication may be, for example, Internet of Things communication. Because a spectrum resource assigned by a base station to a D2D device is used, the first-type D2D communication is also referred to as specific type (first type) D2D communication herein. In the resource that is assigned by the base station and is used to perform D2D communication, the base station may specify that a part of the resource is dedicated to specific-type D2D communication, that is, the first-type D2D communication. The first control channel resource that is dedicated to the first-type D2D communication may have, according to a requirement of the first-type D2D communication, a physical parameter configuration (referred to as a first physical parameter configuration) different from that of another D2D control channel resource. The first physical parameter configuration comprises but not limited to at least one of the following: a reference signal density, a cyclic prefix CP length, a carrier interval, and the like. The SA information is used to instruct the at least one D2D device to perform data transmission of the first-type D2D communication by at least partially using the D2D data channel resource. In other words, in the method in this embodiment, a D2D control channel resource different from other D2D communication is assigned for the first-type D2D communication, but a same D2D data channel resource is assigned for all D2D communication.

In conclusion, in the method in this embodiment, a control channel resource independent of other D2D communication is assigned for specific-type D2D communication, so that at the same time when transmission quality of specific-type D2D communication is improved, use efficiency as the specific-type D2D communication and other D2D communication coexist on a spectrum resource is improved.

It should be understood by a person skilled in the art that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

In addition, an embodiment of the present application further provides a computer readable medium, comprising a computer readable instruction that performs, when being executed, the following operation: executing operations of steps of the method shown in the implementing manner in the foregoing FIG. 1(a).

In addition, an embodiment of the present application further provides a computer readable medium, comprising a computer readable instruction that performs, when being executed, the following operation: executing operations of steps of the method shown in the implementing manner in the foregoing FIG. 2.

Figure 3A:
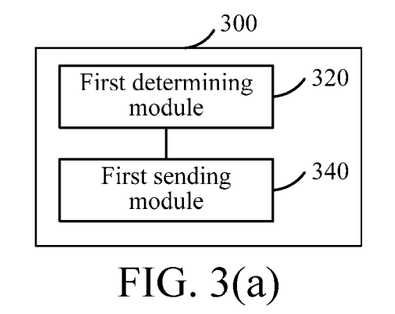
FIG. 3(a) to FIG. 3(b) are structural block diagrams of two examples of D2D communication according to an embodiment of the present application.

FIG. 3(a) is a structural block diagram of an example of a D2D communication apparatus according to an embodiment of the present application. The apparatus may be or belong to a D2D device. As shown in FIG. 3(a), the D2D communication apparatus 300 in this embodiment of the present application comprises:

a first determining module 320, configured to determine a usable resource in a D2D communication resource, where the usable resource comprises a D2D control channel resource and a D2D data channel resource; and a first sending module 340, configured to send SA information correlated to at least one D2D device by using a first control channel resource in the D2D control channel resource.

The D2D control channel resource is, for example, a physical sidelink control channel (PSCCH), and is used to transmit control information correlated to D2D communication. The D2D data channel resource is, for example, a PSCCH, and is used to transmit D2D data. In the method in this embodiment, the first control channel resource is only used to transmit control information correlated to first-type D2D communication. To meet a communication requirement (for example, a delay requirement) of the first-type D2D communication, a first physical parameter configuration of the first control channel resource is different from a physical parameter configuration of another control channel resource in the D2D control channel resource, and the first physical parameter configuration of the first control channel resource may also be predefined, for example, is specified by a base station. Therefore, the at least one D2D device demodulates control information received on the first control channel resource according to a known first physical parameter configuration matching the first control channel resource.

In the apparatus in this embodiment, the first-type D2D communication may be any communication manner combined with a D2D communication technology. The combination comprises resource sharing. Such first-type D2D communication may be, for example, Internet of Things communication. Because a spectrum resource assigned by a base station to a D2D device is used, the first-type D2D communication is also referred to as specific type (first type) D2D communication herein. In the resource that is assigned by the base station and is used to perform D2D communication, the base station may specify that a part of the resource is dedicated to specific-type D2D communication, that is, the first-type D2D communication. The first control channel resource that is dedicated to the first-type D2D communication may have, according to a requirement of the first-type D2D communication, a physical parameter configuration (referred to as a first physical parameter configuration) different from that of another D2D control channel resource. The first physical parameter configuration comprises but not limited to at least one of the following: a reference signal density, a cyclic prefix CP length, a carrier interval, and the like. The SA information is used to instruct the at least one D2D device to perform data transmission of the first-type D2D communication by at least partially using the D2D data channel resource. In other words, for the apparatus in this embodiment, the first-type D2D communication uses a D2D control channel resource different from that of other D2D communication, but a same D2D data channel resource may be shared. As shown in FIG. 1(b), a part of the D2D control channel resource is a first control channel resource dedicated to first-type D2D. As shown by a backslash fill in FIG. 1(b), the control information transmitted on the D2D control channel resource indicates (as shown by a solid-line arrow) that the D2D data channel resource can be used in all D2D communication, which comprises the first-type D2D communication. SA transmitted on the first control channel resource indicates that D2D devices that perform the first-type D2D communication at least partially share the D2D data channel resource, and indicates (as shown by a dotted-line arrow) positions of data channel resources corresponding to the D2D devices, and the positions are shown by a slash fill in FIG. 1(b).

In conclusion, the apparatus in this embodiment uses a control channel resource independent of other D2D communication, so that at the same time when transmission quality of specific-type D2D communication is improved, use efficiency as the specific-type D2D communication and other D2D communication coexist on a spectrum resource is improved.

As discussed above, the first-type D2D communication is a communication type that has a specific transmission requirement. In the method in this embodiment, the D2D device may determine, based on a specific property of such first-type D2D communication, to use the first control channel resource to transmit control information related to that a target D2D device performs the first-type D2D communication. Specifically:

In a possible implementing manner, the first-type D2D communication may be a communication type related to a D2D device that moves at a high speed. D2D communication in high-speed movement requires, for example, denser reference signals, and longer cyclic prefixes, to adapt to rapid changes in channel conditions. In such an implementing manner, the first control channel resource may be used according to a speed of a communication object to send SA. In such a case, in response to that a speed of the at least one D2D device meets a first preset condition, a first sending module 420 may send the SA information by using the first control channel resource. The first preset condition may be a predefined speed threshold or range matching the first-type D2D communication. For example, the speed of a D2D device stays above the speed threshold within a particular time period, and the first preset condition and a physical configuration parameter of the first control channel resource may be set according to a transmission requirement of the first-type D2D communication.

Such a communication type related to a D2D device that moves at a high speed may be, for example, V2V communication in the Internet of Vehicles. That is, the first communication type may be V2V communication. The V2V communication is one of the typical scenarios of D2D communication that are enhanced for the Internet of Things. For example, for an operation or action such as high-speed driving, lane changing, and speed reduction of a vehicle, a warning may be sent by using a manner of D2D communication, and another vehicle around the vehicle gives an alarm to a driver based on the received warning, or even automatic manipulation of the vehicle is performed in an emergency, so as to shorten a reaction time of the driver in an emergent situation during driving, and reduce the rate of occurrence of traffic accidents. In addition, by using D2D discovery, a vehicle may discover and recognize a specific vehicle near the vehicle more reliably, where the specific vehicle is, for example, a vehicle that is passing by a crossing and faces a potential danger, or a vehicle that has a specific property and requires special attention (for example, a vehicle carrying hazardous materials, and a school bus). The V2V communication usually relates to high-speed movement of a D2D device, and requires a relatively high transmission quality in the high-speed movement.

In another possible implementing manner, the first-type D2D communication may be recognized by using a device type of a D2D communications device. In such an implementing manner, a D2D device may use the first control channel resource according to a device type of a communication object. Specifically, in response to that a device type of the at least one D2D device meets a second preset condition, the first sending module 420 may send the SA information by using the first control channel resource. The second preset condition may be one or more predefined device types matching the first-type D2D communication, and the second preset condition and the physical configuration parameter of the first control channel resource may be set according to a transmission requirement of the first-type D2D communication.

The first control channel resource may be used in response to that the device type of the D2D device is a vehicle or an on-board device (V2V communication). Alternatively, the first control channel resource may be used in response to that the device type of the D2D device relates to a specific-type application scenario, for example, public safety, and medical care.

In still another possible implementing manner, the first-type D2D communication may be recognized by using content of data to be transmitted. In such an implementing manner, the D2D device may use the first control channel resource according to content of data to be transmitted to the at least one D2D device. Specifically, in response to that content of data to be transmitted to the at least one D2D device meets a third preset condition, the first sending module 420 may send the SA information by using the first control channel resource. The third preset condition may be a predefined condition that matches the first-type D2D communication and is related to the content of the data. The condition is, for example, an importance level of the content of the data to be transmitted (for example, in scenarios such as public safety and medical care, content of data to be transmitted has a relatively high importance level). When the content of the data to be transmitted has a high importance level, the first control channel resource is used to send the SA information, or otherwise, a conventional D2D control channel resource is used. The third preset condition and the physical configuration parameter of the first control channel resource may be set according to a transmission requirement of the first-type D2D communication.

It should be noted that, according to a specific type and/or application scenario of the first-type D2D communication, a different physical configuration parameter of a first control channel resource may be designed.

In addition, in the apparatus in this embodiment, a D2D device that receives SA transmitted on a first control channel resource may transmit, in response to that the SA is received on the first control channel resource, a data packet having a second physical parameter configuration matching first D2D communication, so as to better meet a transmission quality requirement of the first-type D2D communication. For example, for V2V communication, denser reference signals, longer cyclic prefixes, larger symbol lengths, and the like may be used. Alternatively, the data packet may be encapsulated and transmitted by using a physical parameter configuration of a conventional D2D data packet. In a possible implementing manner, the SA is used to indicate a specific position of a D2D data channel resource that can be used by the D2D device, and in addition, may be further used to indicate the second physical parameter configuration, of the data packet, matching the first-type D2D communication. That is, according to a transmission requirement of the first-type D2D communication, in addition to the physical parameter of the first control channel resource, for the apparatus in this embodiment, a corresponding physical parameter configuration may be further indicated for data correlated to first type D2D, where the physical parameter configuration comprises a reference signal density, a cyclic prefix length, and the like. In such a case, when the SA transmitted on the first control channel resource is received, the data packet having the second physical parameter configuration is encapsulated and transmitted according to the indication of the SA.

Figure 3B:
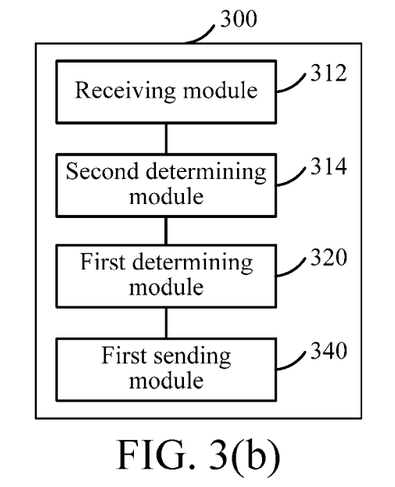

It should be further noted that, as shown in FIG. 3(b), the apparatus 300 in this embodiment may further comprise:

a receiving module 312, configured to receive resource assignment information correlated to the D2D communication resource; and a second determining module 314, configured to determine the D2D communication resource based on the resource assignment information.

For example, resource assignment information sent by a base station is received, where the resource assignment information indicates a D2D control channel resource and a D2D data channel resource that are assigned by the base station and may be used for D2D communication, and the resource assignment information further indicates a first control channel resource. The first determining module 320 may determine, by using a manner of, for example, contention, an actual usable resource in the D2D communication resource assigned by the base station.

In conclusion, the apparatus in this embodiment enhances D2D communication for the Internet of Things, an independent D2D control channel resource more suitable for a specific communication type such as the Internet of Things is provided, and data communication parts share a D2D data channel resource, so as to share the D2D data channel resource to the greatest extent, configure a large quantity of data channel resources more flexibly, and especially adapt to a requirement of a user that first-type D2D communication and other D2D communication need to be used at a same moment.

Figure 4:
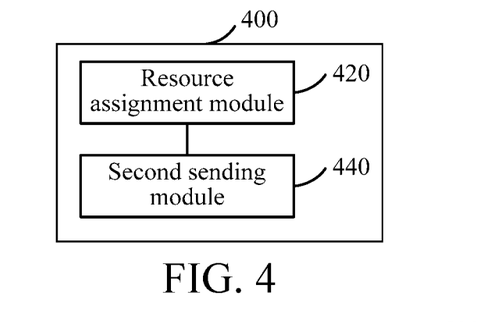
FIG. 4 is a structural block diagram of an example of an apparatus for assigning a D2D communication resource according to an embodiment of the present application.

FIG. 4 is a structural block diagram of an example of embodiment of an apparatus for assigning a D2D communication resource according to the present application. The apparatus may belong to a base station. As shown in FIG. 4, the apparatus 400 comprises:

a resource assignment module 420, configured to assign a resource correlated to D2D communication; and a second sending module 440, configured to send resource assignment information correlated to the assignment.

The resource correlated to D2D communication comprises a D2D control channel resource and a D2D data channel resource, wherein the D2D control channel resource comprises a first control channel resource, the first control channel resource is only used to transmit control information correlated to first-type D2D communication, a first physical parameter configuration of the first control channel resource is different from a physical parameter configuration of another control channel resource in the D2D control channel resource, and the D2D data channel resource is used to transmit all D2D data.

As described with reference to FIG. 2(*a*), the D2D control channel resource is used to transmit control information correlated to D2D communication. The D2D data channel resource is used to transmit D2D data. In the apparatus in this embodiment, in the D2D control channel resource, a first control channel resource is assigned for the first-type D2D communication, where the first control channel resource is only used to transmit control information correlated to the first-type D2D communication. To meet a communication requirement (for example, a delay requirement) of the first-type D2D communication, the first physical parameter configuration of the first control channel resource is different from a physical parameter configuration of another control channel resource in the D2D control channel resource, and the first physical parameter configuration of the first control channel resource may also be predefined, for example, is specified by a base station. Therefore, the at least one D2D device demodulates control information received on the first control channel resource according to a known first physical parameter configuration matching the first control channel resource.

In the apparatus in this embodiment, the first-type D2D communication may be any communication manner combined with a D2D communication technology. The combination comprises resource sharing. Such first-type D2D communication may be, for example, Internet of Things communication. Because a spectrum resource assigned by a base station to a D2D device is used, the first-type D2D communication is also referred to as specific type (first type) D2D communication herein. In the resource that is assigned by the base station and is used to perform D2D communication, the base station may specify that a part of the resource is dedicated to specific-type D2D communication, that is, the first-type D2D communication. The first control channel resource that is dedicated to the first-type D2D communication may have, according to a requirement of the first-type D2D communication, a physical parameter configuration (referred to as a first physical parameter configuration) different from that of another D2D control channel resource. The first physical parameter configuration comprises but not limited to at least one of the following: a reference signal density, a cyclic prefix CP length, a carrier interval, and the like. The SA information is used to instruct the at least one D2D device to perform data transmission of the first-type D2D communication by at least partially using the D2D data channel resource. In other words, the apparatus in this embodiment assigns a D2D control channel resource different from other D2D communication for the first-type D2D communication, but assigns a same D2D data channel resource for all D2D communication.

In conclusion, the apparatus in this embodiment assigns a control channel resource independent of other D2D communication for specific-type D2D communication, so that at the same time when transmission quality of specific-type D2D communication is improved, use efficiency as the specific-type D2D communication and other D2D communication coexist on a spectrum resource is improved.

Figure 5:
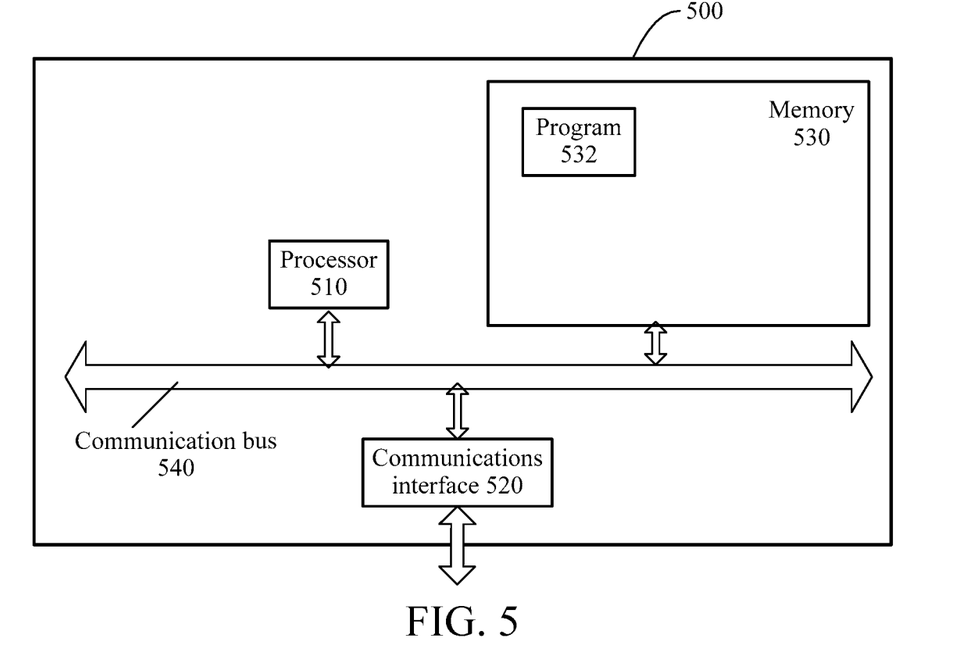
FIG. 5 is a structural block diagram of another example of a D2D communication apparatus according to an embodiment of the present application.

FIG. 5 is a schematic structural diagram of still another example of a D2D communication apparatus according to an embodiment of the present application, and the specific embodiments of the present application do not limit the specific implementation of the D2D communication apparatus. As shown in FIG. 5, the D2D communication apparatus 500 may comprise:

a processor 510, a communications interface 520, a memory 530, and a communication bus 540. In this case:

the processor 510, the communications interface 520, and the memory 530 accomplish mutual communications via the communication bus 540.

The communications interface 520 is configured to communicate with a network element such a client.

The processor 510 is configured to execute a program 532, and specifically, may execute relevant steps in the embodiment of the method shown in FIG. 1(*a*) above.

Specifically, the program 532 may comprise a program code, the program code comprising a computer operation instruction.

The processor 510 may be a central processing unit CPU, or an application specific integrated circuit ASIC, or be configured to be one or more integrated circuits which implement the embodiments of the present application.

The memory 530 is configured to store the program 532. The memory 530 may comprise a high-speed RAM memory, or may also comprise a non-volatile memory, for example, at least one magnetic disk memory. The program 532 may specifically be used to cause the D2D communication apparatus 500 to perform the following steps:

determining a usable resource in a D2D communication resource, where the usable resource comprises a D2D control channel resource and a D2D data channel resource; and sending SA information correlated to at least one D2D device by using a first control channel resource in the D2D control channel resource, wherein the first control channel resource is only used to transmit control information correlated to first-type D2D communication, and a first physical parameter configuration of the first control channel resource is different from a physical parameter configuration of another control channel resource in the D2D control channel resource; and the SA information is used to instruct the at least one D2D device to perform data transmission of the first-type D2D communication by using the D2D data channel resource.

Reference may be made to the corresponding description of corresponding steps or units in the foregoing embodiments for the specific implementation of the steps in the program 532, and will not be described here. It may be clearly known by those skilled in the art that reference may be made to the description of corresponding procedures in the foregoing embodiments of the method for the specific working procedures of the devices and modules described above, and will not be described here in order to make the description convenient and concise.

It may be clearly known by those skilled in the art that reference may be made to the corresponding description in the foregoing embodiments of the apparatus for the specific working procedures of the devices and modules described above, and will not be described here in order to make the description convenient and concise.

Figure 6:
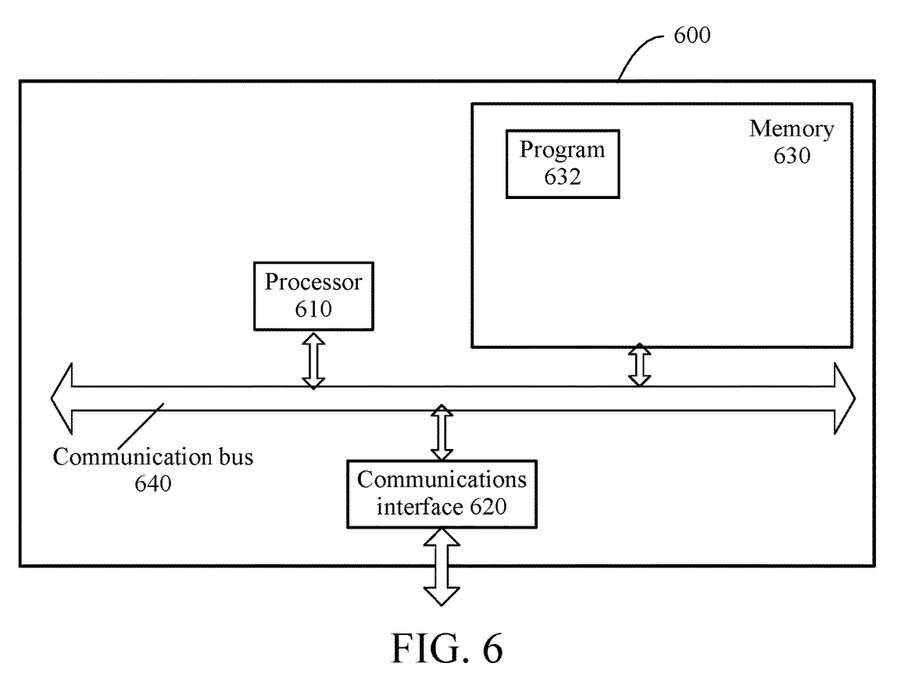
FIG. 6 is a structural block diagram of another example of an apparatus for assigning a D2D communication resource according to an embodiment of the present application.

FIG. 6 is a schematic structural diagram of still another example of an apparatus for assigning a D2D communication resource according to an embodiment of the present application, and the specific embodiments of the present application do not limit the specific implementation of the apparatus for assigning a D2D communication resource. As shown in FIG. 6, the resource assignment apparatus 600 may comprise:

a processor 610, a communications interface 620, a memory 630, and a communication bus 640. In this case:

the processor 610, the communications interface 620, and the memory 630 accomplish mutual communications via the communication bus 640.

The communications interface 620 is configured to communicate with a network element such a client.

The processor 610 is configured to execute a program 632, and specifically, may execute relevant steps in the embodiment of the method shown in FIG. 2 above.

Specifically, the program 632 may comprise a program code, the program code comprising a computer operation instruction.

The processor 610 may be a central processing unit CPU, or an application specific integrated circuit ASIC, or be configured to be one or more integrated circuits which implement the embodiments of the present application.

The memory 630 is configured to store the program 632. The memory 630 may comprise a high-speed RAM memory, or may also comprise a non-volatile memory, for example, at least one magnetic disk memory. The program 632 may specifically be used to cause the apparatus 600 for assigning a D2D communication resource to perform the following steps:

assigning a resource correlated to D2D communication; and sending resource assignment information correlated to the assignment, wherein the resource correlated to D2D communication comprises a D2D control channel resource and a D2D data channel resource, wherein the D2D control channel resource comprises a first control channel resource, the first control channel resource is only used to transmit control information correlated to first-type D2D communication, and a first physical parameter configuration of the first control channel resource is different from a physical parameter configuration of another control channel resource in the D2D control channel resource.

Reference may be made to the corresponding description of corresponding steps or units in the foregoing embodiments for the specific implementation of the steps in the program 632, and will not be described here. It may be clearly known by those skilled in the art that reference may be made to the description of corresponding procedures in the foregoing embodiments of the method for the specific working procedures of the devices and modules described above, and will not be described here in order to make the description convenient and concise.

It may be clearly known by those skilled in the art that reference may be made to the corresponding description in the foregoing embodiments of the apparatus for the specific working procedures of the devices and modules described above, and will not be described here in order to make the description convenient and concise.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments wherein tasks are performed by remote processing devices linked through a communications network. In a distributed computing environment, program modules may be located in both local and remote memory storage devices.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above implementations are only used to describe the present invention, without limiting the present invention; various alterations and variants can be made by those skilled in the art without departing from the spirit and scope of the present invention, so all equivalent technical solutions also belong to the scope of the present invention, and the scope of patent protection of the present invention should be defined by claims.

What is claimed is:

1. A device-to-device (D2D) communication method, comprising:

determining a usable resource in a D2D communication resource, wherein the usable resource comprises a D2D control channel resource and a D2D data channel resource; and in response to that content of data to be transmitted to the at least one D2D device meets a first preset condition, sending scheduling assignment (SA) information correlated to at least one D2D device using a first control channel resource in the D2D control channel resource, wherein the first preset condition is an importance level of the content of the data to be transmitted;

wherein the first control channel resource is only used to transmit control information correlated to first-type D2D communication comprising Internet of Things communication, and a first physical parameter configuration of the first control channel resource is different from a physical parameter configuration of another control channel resource in the D2D control channel resource;

wherein the first physical parameter configuration comprises at least one parameter of or an index of the at least one parameter of: a reference signal density, a cyclic prefix length, and a carrier interval; and wherein the SA information is used to instruct the at least one D2D device to perform data transmission of the first-type D2D communication using the D2D data channel resource.

2. The method of claim 1, wherein the SA information is further used to indicate a second physical parameter of a data packet matching the first-type D2D communication.

3. The method of claim 1, wherein the sending SA information correlated to at least one D2D device using a first control channel resource in the D2D control channel resource comprises:

in response to that a speed of the at least one D2D device meets a second preset condition, sending the SA information using the first control channel resource.

4. The method of claim 1, wherein the sending SA information correlated to at least one D2D device using a first control channel resource in the D2D control channel resource comprises:

in response to that a device type of the at least one D2D device meets a third preset condition, sending the SA information using the first control channel resource.

5. The method of claim 1, further comprising:

receiving resource assignment information correlated to the D2D communication resource; and determining the D2D communication resource based on the resource assignment information.

6. The method of claim 1, wherein the first-type D2D communication comprises: Internet of Vehicles vehicle-to-vehicle (V2V) communication.

7. A method for assigning a device-to-device (D2D) communication resource, comprising:

providing an assignment by assigning a resource correlated to D2D communication; and sending resource assignment information correlated to the assignment, wherein the resource correlated to D2D communication comprises a D2D control channel resource and a D2D data channel resource, the D2D control channel resource comprises a first control channel resource, the first control channel resource is only used to transmit control information correlated to first-type D2D communication comprising Internet of Things communication, and a first physical parameter configuration of the first control channel resource is different from a physical parameter configuration of another control channel resource in the D2D control channel resource;

wherein the first physical parameter configuration comprises at least one parameter of or an index of the at least one parameter of: a reference signal density, a cyclic prefix length, and a carrier interval; and wherein in response to that content of data to be transmitted meets a first preset condition, the control information is transmitted using the first control channel resource, and the first preset condition is an importance level of the content of the data to be transmitted.

8. The method of claim 7, wherein the first-type D2D communication comprises: Internet of Vehicles vehicle-to-vehicle (V2V) communication.

9. A non-transitory computer-readable storage medium configured with instructions executable by one or more processors to cause the one or more processors to perform operations comprising:

determining a usable resource in a D2D communication resource, wherein the usable resource comprises a D2D control channel resource and a D2D data channel resource; and in response to that content of data to be transmitted to the at least one D2D device meets a first preset condition, sending scheduling assignment (SA) information correlated to at least one D2D device using a first control channel resource in the D2D control channel resource, wherein the first preset condition is an importance level of the content of the data to be transmitted;

wherein the first control channel resource is only used to transmit control information correlated to first-type D2D communication comprising Internet of Things communication, and a first physical parameter configuration of the first control channel resource is different from a physical parameter configuration of another control channel resource in the D2D control channel resource;

wherein the first physical parameter configuration comprises at least one parameter of or an index of the at least one parameter of: a reference signal density, a cyclic prefix length, and a carrier interval; and wherein the SA information is used to instruct the at least one D2D device to perform data transmission of the first-type D2D communication using the D2D data channel resource.

10. A device-to-device (D2D) communication apparatus, comprising:

a transceiver;

a memory configured to store an instruction; and a processor configured to execute the instruction stored in the memory to causes the processor to perform operations including:

determining a usable resource in a D2D communication resource, wherein the usable resource comprises a D2D control channel resource and a D2D data channel resource; and sending, in response to that content of data to be transmitted to the at least one D2D device meets a first preset condition, by the transceiver, scheduling assignment (SA) information correlated to at least one D2D device using a first control channel resource in the D2D control channel resource, wherein the first preset condition is an importance level of the content of the data to be transmitted;

wherein the first control channel resource is only used to transmit control information correlated to first-type D2D communication comprising Internet of Things communication, and a first physical parameter configuration of the first control channel resource is different from a physical parameter configuration of another control channel resource in the D2D control channel resource;

wherein the first physical parameter configuration comprises at least one parameter of or an index of the at least one parameter of: a reference signal density, a cyclic prefix length, and a carrier interval; and wherein the SA information is used to instruct the at least one D2D device to perform data transmission of the first-type D2D communication using the D2D data channel resource.

11. The apparatus of claim 10, wherein the operations further comprises: in response to that a device type of the at least one D2D device meets a third preset condition, sending the SA information using the first control channel resource.

12. The apparatus of claim 10, wherein the operations further comprises:
receiving resource assignment information correlated to the D2D communication resource; and
determining the D2D communication resource based on the resource assignment information.

13. A non-transitory computer-readable storage medium configured with instructions executable by one or more processors to cause the one or more processors to perform operations comprising:
providing an assignment by assigning a resource correlated to D2D communication; and
sending resource assignment information correlated to the assignment,
wherein the resource correlated to D2D communication comprises a D2D control channel resource and a D2D data channel resource, the D2D control channel resource comprises a first control channel resource, the first control channel resource is only used to transmit control information correlated to first-type D2D communication comprising Internet of Things communication, and a first physical parameter configuration of the first control channel resource is different from a physical parameter configuration of another control channel resource in the D2D control channel resource;

wherein the first physical parameter configuration comprises at least one parameter of or an index of the at least one parameter of: a reference signal density, a cyclic prefix length, and a carrier interval; and wherein in response to that content of data to be transmitted meets a first preset condition, the control information is transmitted using the first control channel resource, and the first preset condition is an importance level of the content of the data to be transmitted.

14. The apparatus of claim 10, wherein the operations further comprises: in response to that a speed of the at least one D2D device meets a second preset condition, sending the SA information using the first control channel resource.

15. An apparatus for assigning a device-to-device (D2D) communication resource, wherein the apparatus comprises:
a transceiver;
a memory configured to store an instruction; and
a processor configured to execute the instruction stored in the memory to causes the processor to perform operations including:
providing an assignment by assigning a resource correlated to D2D communication;
sending, by the transceiver, resource assignment information correlated to the assignment,
wherein the resource correlated to D2D communication comprises a D2D control channel resource and a D2D data channel resource, the D2D control channel resource comprises a first control channel resource, the first control channel resource is only used to transmit control information correlated to first-type D2D communication comprising Internet of Things communication, and a first physical parameter configuration of the first control channel resource is different from a physical parameter configuration of another control channel resource in the D2D control channel resource;

wherein the first physical parameter configuration comprises at least one parameter of or an index of the at least one parameter of: a reference signal density, a cyclic prefix length, and a carrier interval; and wherein in response to that content of data to be transmitted meets a first preset condition, the control information is transmitted using the first control channel resource, and the first preset condition is an importance level of the content of the data to be transmitted.

* * * * *